US011995154B2

(12) United States Patent
Wang

(10) Patent No.: US 11,995,154 B2
(45) Date of Patent: May 28, 2024

(54) METHOD OF DETERMINING STATE OF TARGET OBJECT, ELECTRONIC DEVICE, AND STORAGE MEDIUM

(71) Applicant: Beijing Baidu Netcom Science Technology Co., Ltd., Beijing (CN)

(72) Inventor: Yongqing Wang, Beijing (CN)

(73) Assignee: Beijing Baidu Netcom Science Technology Co., Ltd., Beijing (CN)

( * ) Notice: Subject to any disclaimer, the term of this patent is extended or adjusted under 35 U.S.C. 154(b) by 83 days.

(21) Appl. No.: 17/901,403

(22) Filed: Sep. 1, 2022

(65) Prior Publication Data

US 2022/0414394 A1 Dec. 29, 2022

(30) Foreign Application Priority Data

Sep. 3, 2021 (CN) .......................... 202111035716.1

(51) Int. Cl.
*G06F 18/23* (2023.01)
*G06V 10/75* (2022.01)

(52) U.S. Cl.
CPC ............ *G06F 18/23* (2023.01); *G06V 10/757* (2022.01)

(58) Field of Classification Search
CPC ...... G06V 10/757; G06F 18/23; G08G 1/207; G08G 1/133; G08G 1/127

(Continued)

(56) References Cited

U.S. PATENT DOCUMENTS 2,020,003 A * 11/1935 Sloane .................... E21C 31/10
299/71
10,580,301 B2 * 3/2020 Anvari .................. G01S 13/933
(Continued)

FOREIGN PATENT DOCUMENTS

| CN | 109766902 | 5/2019 |
|---|---|---|
| CN | 109902703 | 6/2019 |

(Continued)

OTHER PUBLICATIONS

"Algorithm study for stay points recognition of spatial trajectoy based on velocity", Geography and Geo-Information Science, vol. 32, No. 6, Nov. 2016, 7 pages.

(Continued)

*Primary Examiner* — Pritham D Prabhakher
(74) *Attorney, Agent, or Firm* — HSML, P.C.

(57) ABSTRACT

A method of determining a state of a target object, an electronic device, and a storage medium, relate to fields of a computer technology, cloud computing and Internet of things, and apply to smart cities. The method includes: receiving a transmitted first moving point sequence for the target object, the first moving point sequence including a plurality of target moving point elements, and each target moving point element containing a timestamp information and a displacement information that indicate a stay state of the target object; determining, from the first moving point sequence, a target stay point of the target object, according to the timestamp information and the displacement information; and determining that the state of the target object at the target stay point is an abnormal stay state, in response to a distance between the target stay point and a first preset position being less than a first preset threshold.

20 Claims, 4 Drawing Sheets

(58) Field of Classification Search
USPC .................................................. 348/208.14
See application file for complete search history.

(56) References Cited

U.S. PATENT DOCUMENTS

| | | | | |
|---|---|---|---|---|
| 11,282,394 | B2* | 3/2022 | Elisha | G08G 1/207 |
| 11,662,215 | B2* | 5/2023 | Bennati | H04L 63/0407 |
| | | | | 701/411 |
| 2005/0057372 | A1* | 3/2005 | Taylor | G08G 1/00 |
| | | | | 340/901 |
| 2013/0144490 | A1* | 6/2013 | Lord | B60T 17/22 |
| | | | | 701/1 |
| 2017/0193404 | A1* | 7/2017 | Yoo | G06Q 10/06 |
| 2018/0032928 | A1* | 2/2018 | Li | G06Q 50/40 |
| 2019/0012571 | A1* | 1/2019 | Ahafonkin | G06F 16/29 |
| 2019/0213742 | A1* | 7/2019 | Tang | G06V 20/17 |
| 2020/0249047 | A1* | 8/2020 | Balva | G01C 21/3438 |
| 2020/0279491 | A1 | 9/2020 | Elisha et al. | |
| 2022/0044064 | A1* | 2/2022 | Zhang | G06V 20/44 |
| 2022/0120583 | A1* | 4/2022 | Sun | H04W 4/029 |

FOREIGN PATENT DOCUMENTS

| | | |
|---|---|---|
| CN | 111144324 | 5/2020 |
| CN | 111192452 | 5/2020 |
| CN | 111738067 | 10/2020 |
| CN | 12650825 | 4/2021 |
| CN | 112712690 | 4/2021 |
| CN | 113177097 | 7/2021 |
| CN | 113221677 | 8/2021 |
| CN | 113239149 | 8/2021 |
| CN | 113312438 | 8/2021 |
| JP | 2015-158799 | 9/2015 |

OTHER PUBLICATIONS

Pang et al., "Crowdsourced mobility prediction based on spatio-temporal contexts", Mobile and Wireless Networking Symposium, 2016, 6 pages.

Extended European Search Report issued in the corresponding European patent application No. 22193695.8, dated Mar. 6, 2023, 7 pages.

* cited by examiner

METHOD OF DETERMINING STATE OF TARGET OBJECT, ELECTRONIC DEVICE, AND STORAGE MEDIUM

CROSS REFERENCE TO RELATED APPLICATION(S)

This application claims priority to Chinese Patent Application No. 202111035716.1, filed on Sep. 3, 2021, the entire content of which is incorporated herein in its entirety by reference.

TECHNICAL FIELD

The present disclosure relates to a field of a computer technology, in particular to fields of cloud computing and Internet of things, and may be applied to fields such as smart cities. Specifically, the present disclosure relates to a method of determining a state of a target object, an electronic device, and a storage medium.

BACKGROUND

With a progress of society and a development of economy, transportation capacities of objects have been greatly improved, and transportation undertakes a main task of changing spatial states of objects. For the same object, different spatial positions may result in different degrees of realization of its use value. For example, in some places, a stay state of an object may lead to a negative effect. Therefore, there is a need to timely discover an object suspected of abnormally staying.

SUMMARY

The present disclosure provides a method of determining a state of a target object, an electronic device, and a storage medium.

According to an aspect of the present disclosure, a method of determining a state of a target object is provided, including: receiving a transmitted first moving point sequence for the target object, wherein the first moving point sequence includes a plurality of target moving point elements, and each of the plurality of target moving point elements contains a timestamp information and a displacement information that indicate a stay state of the target object; determining, from the first moving point sequence, a target stay point of the target object, according to the timestamp information and the displacement information; and determining that the state of the target object at the target stay point is an abnormal stay state, in response to a distance between the target stay point and a first preset position being less than a first preset threshold.

According to an aspect of the present disclosure, an electronic device is provided, including: at least one processor; and a memory communicatively connected to the at least one processor, wherein the memory stores instructions executable by the at least one processor, and the instructions, when executed by the at least one processor, cause the at least one processor to implement the method of determining the state of the target object as described above.

According to an aspect of the present disclosure, a non-transitory computer-readable storage medium having computer instructions therein is provided, and the computer instructions are configured to cause a computer to implement the method of determining the state of the target object as described above.

It should be understood that content described in this section is not intended to identify key or important features in embodiments of the present disclosure, nor is it intended to limit the scope of the present disclosure. Other features of the present disclosure will be easily understood through the following description.

BRIEF DESCRIPTION OF THE DRAWINGS

The accompanying drawings are used for better understanding of the solution and do not constitute a limitation to the present disclosure, wherein.

DETAILED DESCRIPTION OF EMBODIMENTS

Figure 1:
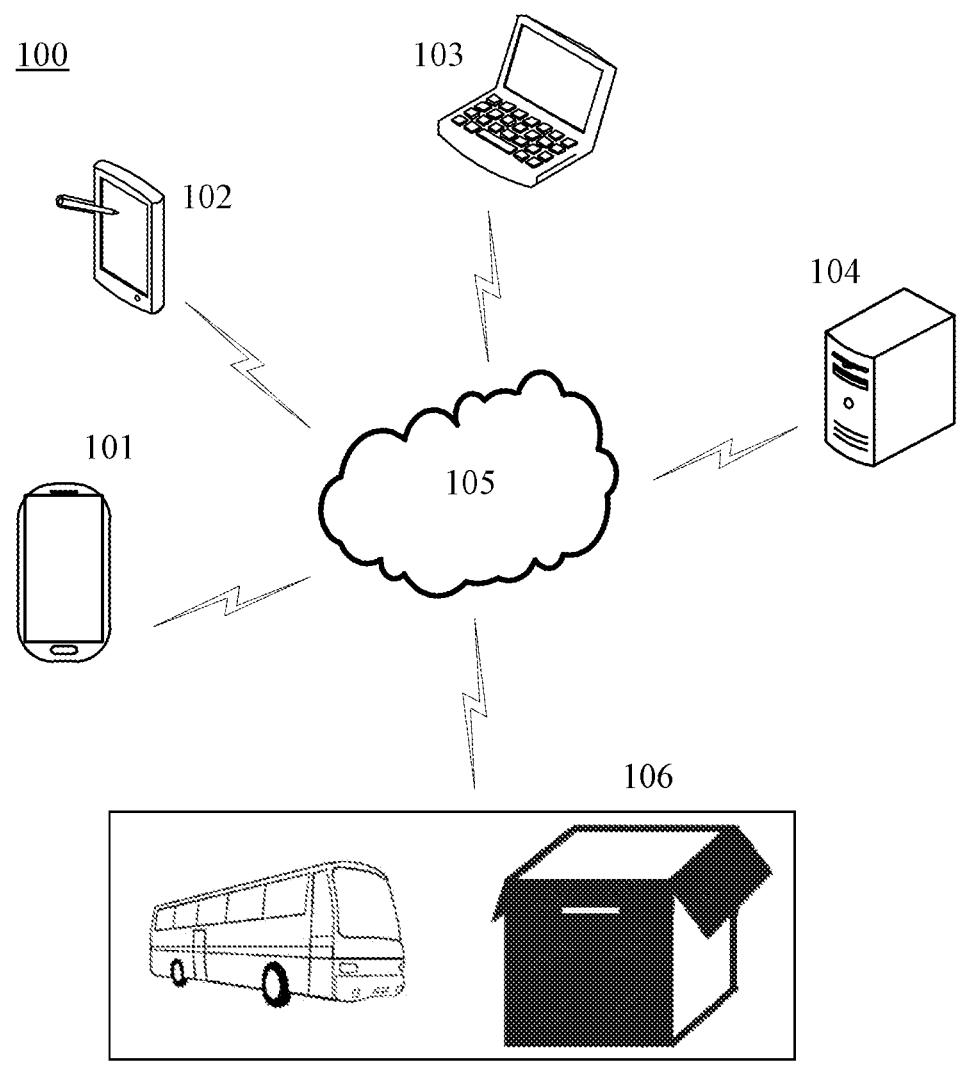
FIG. 1 schematically shows an exemplary system architecture to which a method and an apparatus of determining a state of a target object can be applied according to an embodiment of the present disclosure.

Exemplary embodiments of the present disclosure will be described below with reference to the accompanying drawings, which include various details of embodiments of the present disclosure to facilitate understanding and should be considered as merely exemplary. Therefore, those of ordinary skilled in the art should realize that various changes and modifications may be made to embodiments described herein without departing from the scope and spirit of the present disclosure. Likewise, for clarity and conciseness, descriptions of well-known functions and structures are omitted in the following description.

In the technical solution of the present disclosure, an acquisition, a storage, an application, a processing, a transmission, a provision and a disclosure of user personal information involved comply with provisions of relevant laws and regulations, where necessary security measures are adopted, and do not violate public order and good custom.

For abnormal staying behaviors of some objects in some places where the objects are not allowed to stay, the following solution may be adopted: determining a movement trajectory of a key object; determining, according to the movement trajectory of the key object and a duration of stay of the key object, whether the stay state of the key object is reasonable; determining, combined with an information of a point of interest (POI) of a corresponding place (such as a POI of a shop, a station, a school, etc.), whether the key object stays in violation of rules; and transmitting an early warning prompt.

One of methods of determining an abnormal stay state includes: recording a stay interval of an object through a video. If the object stays around a point of interest where the object is clearly prohibited from appearing or staying, for more than a certain time period, then it is determined that the object is in the abnormal stay state. One of the methods of determining an abnormal stay state includes: setting a restriction condition such as a duration of stay, a stay interval, etc., by means of setting a rule, to select the object in the abnormal stay state. One of the methods of determining an abnormal stay state includes: generating a cluster by using a density-based clustering method, such as DBSCAN (Density-Based Spatial Clustering of Applications with Noise, a density-based clustering algorithm); determining a center point of the cluster as a stay point and determining whether the center point of each cluster is around the point of interest; and determining whether the object is in the abnormal stay state according to whether the center point of each cluster is around the point of interest.

The method of recording through the video is limited by acquired image data. Image data for objects and related points of interest cannot be acquired in many regions, so that many objects in the abnormal stay state may be omitted. In addition, providing image acquisition apparatuses may increase a cost of the solution. Sometimes, weather or occlusion may lead to an error in an object feature recognition of the acquired image data, resulting in a poor robustness of the feature recognition. The method of density-based clustering such as DBSCAN may not use data in temporal dimension, and thus some round-trip track points may also be determined as abnormal stay points, so that an accuracy of a determination result may be reduced.

According to embodiments of the present disclosure, by using a method in which an ST_DBSCAN (a spatio-temporal constrain clustering algorithm) model is combined with a rule-based determination, an accuracy and a recall rate of acquired abnormal stay points may be increased. A data source this solution relies on is a temporal displacement data of the object. Through data cleaning and data preprocessing of the displacement data of the object, a processed temporal sequence of a target object may be obtained, and clusters related to the stay points may be determined by ST_DBSCAN. Combined with rules, a determination and a selection may be further performed on the clusters, so as to obtain a more valid abnormal stay point of the object, and improve the accuracy of the determination of the abnormal stay state of the object.

FIG. 1 schematically shows an exemplary system architecture to which a method and an apparatus of determining a state of a target object can be applied according to an embodiment of the present disclosure.

It should be noted that FIG. 1 only shows an example of the system architecture to which an embodiment of the present disclosure may be applied to help those skilled in the art understand the technical content of the present disclosure, but it does not mean that embodiments of the present disclosure may not be used in other devices, systems, environments or scenarios. For example, in some embodiments, the exemplary system architecture to which the method and the apparatus of determining the state of the target object can be applied may include a terminal device, but the terminal device may implement the method and the apparatus of determining the state of the target object provided by embodiments of the present disclosure without interacting with the server.

As shown in FIG. 1, a system architecture 100 according to this embodiment may include terminal devices 101, 102, 103, a server 104, a network 105, and a target object 106 for providing a data source. The network 105 is a medium for providing a communication link between the terminal devices 101, 102, 103, the server 104, and the target object 106. The network 105 may include various connection types, such as wired or wireless communication links, etc.

The terminal devices 101, 102, 103 and the server 104 used by a user may interact with the target object 106 via the network 105, so as to receive or send a message, etc. Various communication client applications may be installed on the terminal devices 101, 102, 103 and the server 104. For example, knowledge reading applications, web browser applications, search applications, instant messaging tools, mailbox clients and/or social platform software, etc. (for example only) may be installed on the terminal devices 101, 102 and 103.

The terminal devices 101, 102 and 103 may be various electronic devices having display screens and supporting web browsing, including but not limited to smartphones, tablet computers, laptop computers, desktop computers, etc.

The server 104 may be a server that provides various services, such as a background management server (for example only) that provides a support for a content browsed by the user using the terminal devices 101, 102 and 103, or a server that analyzes and processes data of the target object 106. The server may analyze and process a received user request, and feedback a processing result (such as a web page, information, or data acquired or generated according to the user request) to the terminal device or a target object that can receive the information. The server may be a cloud server, also known as a cloud computing server or a cloud host, which is a host product in a cloud computing service system to solve shortcomings of difficult management and weak business scalability existing in an existing physical host and VPS (Virtual Private Server) service. The server may also be a server of a distributed system or a server combined with a block-chain.

The target object may include at least one selected from: a self-movable object such as a vehicle, a self-movable or manually-movable object with a warning sign, other predetermined objects not allowed to appear in some places, or objects.

It should be noted that the method of determining the state of the target object provided by embodiments of the present disclosure may generally be performed by the terminal device 101, 102 or 103. Accordingly, the apparatus of determining the state of the target object provided by embodiments of the present disclosure may be provided in the terminal device 101, 102 or 103.

Alternatively, the method of determining the state of the target object provided by embodiments of the present disclosure may also be generally performed by the server 104. Accordingly, the apparatus of determining the state of the target object provided by embodiments of the present disclosure may also be generally provided in the server 104. The method of determining the state of the target object provided by embodiments of the present disclosure may also be performed by a server or server cluster different from the server 104 and capable of communicating with the terminal devices 101, 102, 103 and/or the server 104. Accordingly, the apparatus of determining the state of the target object provided by embodiments of the present disclosure may also be provided in a server or server cluster different from the server 104 and capable of communicating with the terminal devices 101, 102, 103 and/or the server 104.

For example, when determining the state of the target object, the terminal devices 101, 102, 103 and the server 104 may receive a transmitted first moving point sequence for the target object. The first moving point sequence includes a plurality of target moving point elements, and each target moving point element contains a timestamp information and a displacement information that are used to indicate a stay state of the target object. Then, a target stay point of the target object is determined from the first moving point sequence according to the timestamp information and the displacement information. When a distance between the target stay point and a first preset position is less than a first preset threshold, it is determined that a state of the target object at the target stay point is an abnormal stay state. Alternatively, a server or server cluster capable of communicating with the terminal devices 101, 102, 103 and/or the server 104 analyzes the first moving point sequence for the target object and determines the state of the target object.

It should be understood that the number of terminal devices, network and server shown in FIG. 1 is only schematic. According to implementation requires, any number of terminal device, network and server may be provided.

Figure 2:
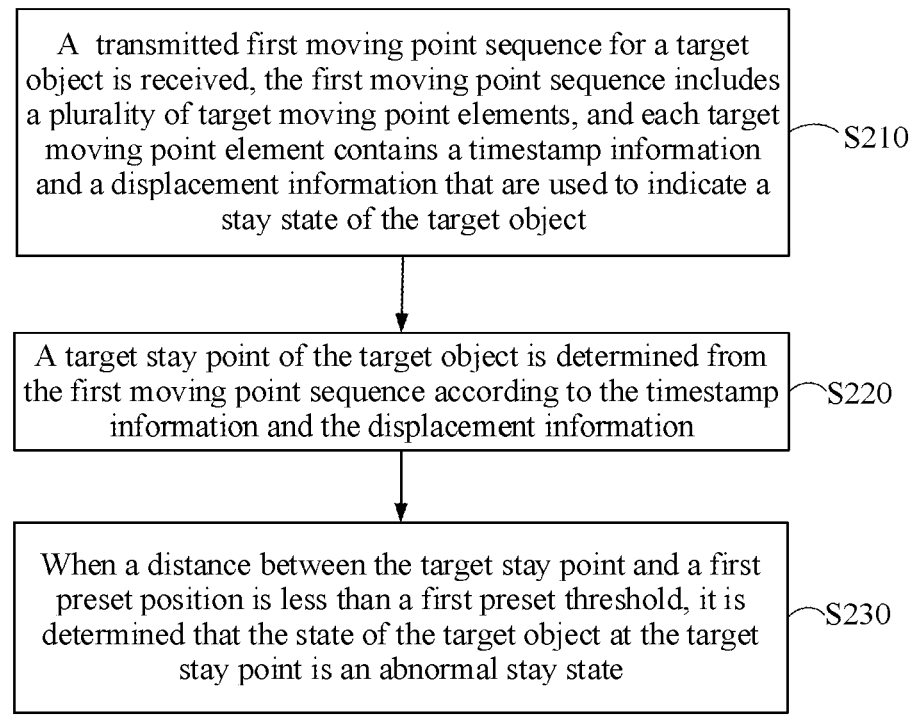
FIG. 2 schematically shows a flowchart of a method of determining a state of a target object according to an embodiment of the present disclosure.

FIG. 2 schematically shows a flowchart of a method of determining a state of a target object according to an embodiment of the present disclosure.

As shown in FIG. 2, the method includes operation S210 to operation S230.

In operation S210, a transmitted first moving point sequence for a target object is received. The first moving point sequence includes a plurality of target moving point elements, and each target moving point element contains a timestamp information and a displacement information that are used to indicate a stay state of the target object.

In operation S220, a target stay point of the target object is determined from the first moving point sequence according to the timestamp information and the displacement information.

In operation S230, when a distance between the target stay point and a first preset position is less than a first preset threshold, it is determined that the state of the target object at the target stay point is an abnormal stay state.

According to embodiments of the present disclosure, the target object may be a target vehicle, including buses such as tourist buses or other mini buses, medium buses and large buses, shared bicycles, or the like. The first moving point sequence may be obtained based on an association information of the target vehicle acquired according to a preset time period when the target vehicle is traveling in a target region. The target region may include various popular regions such as tourist attractions. The association information may include a displacement information, a timestamp, a velocity, a license plate number and other identification information of the target vehicle acquired by the target vehicle in each acquisition period. An initially acquired association information, for example, needs to be preprocessed. After filtering out an invalid data such as an association information containing an empty value and other abnormal values, the first moving point sequence used in the method of determining the state of the vehicle may be obtained. The target region may include at least one target sub-region.

According to embodiments of the present disclosure, the target sub-region may contain a merchant such as a catering merchant, a shopping merchant, a ticket selling merchant, etc. The target sub-region may be determined in combination with a position of each merchant and a region surrounding the merchant, and different target sub-regions may have different sizes. The size of the target sub-region may be determined according to a possibility that the merchant contained therein induces consumption. For example, each merchant may be further scored according to a combination of a score of the merchant, a survey report for the merchant and/or other information, and then a corresponding weight value may be assigned to the merchant according to a scoring result. The greater the weight value, the greater the possibility that the merchant has an adverse behavior such as inducing consumption, and then a large range may be defined with the merchant as a center to determine the target sub-region corresponding to the merchant.

According to embodiments of the present disclosure, the timestamp information may indicate a time instant value corresponding to the object in each state. The displacement information may be expressed in a form of a geographical position of the object, or a form of a displacement distance of the object relative to a reference point (such as the target sub-region), or a form of a displacement offset relative to a position of the object at a previous time instant. Actual forms of the timestamp information and the displacement information are not limited here.

According to embodiments of the present disclosure, the target stay point may include a position of the target vehicle in any stay state, or include a position of the target vehicle in a stay state in which a static duration of the target vehicle meets a preset duration, which is not limited here.

According to embodiments of the present disclosure, the first preset position may be determined according to any point (or regional point) in the target sub-region, or may be determined according to a regional point where the merchant is located in the target sub-region.

According to embodiments of the present disclosure, the first preset threshold may indicate a maximum distance between the target vehicle in the stay state and the merchant. After the target stay point of the target vehicle is determined and the first preset position is determined according to the target sub-region, it may be determined whether the target vehicle is in an abnormal stay state by determining a relationship between the first preset threshold and a distance difference between the target stay point and the first preset position. For example, when the distance difference is less than the first preset threshold, it may indicate that the target vehicle stays at a position close to the merchant, and it may be determined that the stay behavior of the target vehicle may have a possibility of inducing passengers to consume. Accordingly, it may be determined that this stay is an abnormal stay.

It should be noted that an acquisition of the first moving point sequence is authorized by a corresponding user (if an exposure of a personal information of the corresponding user is involved), and the acquisition of all data complies with relevant laws and regulations.

According to embodiments of the present disclosure, when the target object is a predetermined object not allowed to appear in a place, the target region may be a region including the place, and the target sub-region may be a region directly occupied by the place. In this scenario, whether the target object in the place is in the abnormal stay state may be determined according to the displacement information of the target object and a position information of the place where the duration of stay of the target object is limited, combined with the first preset threshold.

Through the above-mentioned embodiments of the present disclosure, the moving point sequence is introduced to analyze a moving process of the target object, and the temporal dimension is introduced, which may solve a problem that a back and forth movement of the object causes a high density and the moving state of the target object may not be accurately determined. Therefore, the accuracy of the determined stay state of the target object may be effectively improved, and then the accuracy of the determined abnormal stay state of the target object may be effectively improved.

The method shown in FIG. 2 will be further described below in combination with specific embodiments.

According to embodiments of the present disclosure, in order to implement the above-mentioned method of determining the state of the target object, for example, it is needed to determine the target object. A process of determining the target object may include: acquiring identification information of a plurality of objects in the target region; determining a target identification information of the target object; and determining the target object from the plurality of objects according to the target identification information.

According to embodiments of the present disclosure, a target vehicle is taken as an example of the target object. In popular regions, there may be a variety of vehicles, such as various types of private cars, tourist buses and so on, and not all stays of vehicles in a region close to merchants have a possibility of inducing passengers on vehicles to consume. Therefore, a selection needs to be performed on various types of vehicles to determine the target vehicle that has a possibility of inducing consumption, such as a tourist bus. Based on a communication function of vehicles, a unique identification information of each vehicle in a communication process may be determined. The identification information may include a license plate number of the vehicle, a unique identification assigned by a communication data to the vehicle, and so on, which is not limited here. The target identification information may be determined according to the unique identification, so that the target vehicle may be determined from the plurality of vehicles according to the target identification information.

According to embodiments of the present disclosure, when the target object is a predetermined object not allowed to appear in a place, the identification information of the object may include at least one selected from: a feature information of the object, or other warning identification information.

Through the above-mentioned embodiments of the present disclosure, the target object may be selected from the plurality of objects. On the one hand, a data amount that needs to be analyzed in the entire process of implementing the method of determining the state of the target object may be reduced; on the other hand, the accuracy of the determined state of the target object may be effectively improved.

According to embodiments of the present disclosure, in order to implement the above-mentioned method of determining the state of the target object, for example, it is further needed to determine the first moving point sequence. A process of determining the first moving point sequence of the target object may include: acquiring a second moving point sequence for a plurality of objects in the target region, where the second moving point sequence contains identification information of the objects corresponding to the second moving point sequence; determining the target identification information of the target object; and determining the first moving point sequence from the second moving point sequence according to the target identification information.

According to embodiments of the present disclosure, a target vehicle is taken as an example of the target object. The second moving point sequence may be obtained based on an association information of all vehicles with a communication function in the target region acquired according to a preset time period. The association information may include a displacement information, a timestamp, a velocity, a license plate number and other identification information acquired for each vehicle in each acquisition period. The preprocessing of the initially acquired association information of each vehicle may also be performed at this time. After filtering out the invalid data such as an association information having an empty value and other abnormal values, the second moving point sequence without invalid data may be obtained.

According to embodiments of the present disclosure, as each element in the second moving point sequence contains the identification information for distinguishing vehicles, after the target identification information of the target vehicle is determined, a selection may be performed on the second moving point sequence according to the target identification information, then the first moving point sequence containing the target identification information may be obtained.

Through the above-mentioned embodiments of the present disclosure, the first moving point sequence for the target object may be determined from the second moving point sequence for the plurality of objects. On the one hand, a data amount that needs to be analyzed in the entire process of implementing the method of determining the state of the target object may be reduced; on the other hand, the accuracy of the determined state of the target object may be effectively improved.

According to embodiments of the present disclosure, determining, from the first moving point sequence, the target stay point of the target object according to the timestamp information and the displacement information may include: performing clustering on the first moving point sequence according to the timestamp information and the displacement information to obtain at least one cluster; determining a target cluster from the at least one cluster according to a preset rule; and determining the target stay point according to an element value corresponding to a cluster center of the target cluster.

According to embodiments of the present disclosure, a target vehicle is taken as an example of the target object. After performing clustering on the first moving point sequence, for example, a plurality of clusters indicating a travel state or stay state of the vehicle may be obtained. The target cluster may be, for example, a cluster for indicating a trajectory sequence of the vehicle in various stay states. In this embodiment, the displacement information contained in the element value corresponding to the cluster center may represent the target stay point of the target vehicle in this stay.

Through the above-mentioned embodiments of the present disclosure, the target stay point may be determined according to the cluster center of the cluster obtained by clustering. The target stay point of the target object at each stay may be determined, and then it may be determined whether the stay state of the target object is the abnormal stay state according to the determined target stay point, so that an accuracy of a determination result may be effectively improved, and a possible generation of determination error due to an unfixed target stay point may be avoided.

According to embodiments of the present disclosure, performing clustering on the first moving point sequence may include: performing clustering on the first moving point sequence by using a spatio-temporal constraint-based clustering algorithm.

According to embodiments of the present disclosure, the spatio-temporal constraint-based clustering algorithm may be expressed by the following equation:

$$C=\Sigma^n(E_1(v,d)\&E_2(t)\&M(p))$$

wherein C represents a cluster obtained by an improved density-based clustering algorithm; $E_1$ represents a spatial neighborhood; v represents an input data velocity; d represents an input data distance; v and d are data obtained after a position and time conversion; & represents AND gate; $E_2$ represents a temporal neighborhood; M represents a minimum number of clustering points; n represents a total number of samples in a set; t represents an attribute of the temporal dimension; and p represents a core point in the sample set.

According to embodiments of the present disclosure, based on the ST_DBSCAN algorithm, the input data is a distance from one point to a next point and an average velocity feature, rather than a spatial distance feature after a position conversion, so that a feature selection may be better than only considering the spatial distance feature between points. Therefore, compared with the original DBSCAN algorithm, there are more choices in feature types.

Through the above-mentioned embodiments of the present disclosure, the ST_DBSCAN algorithm is introduced, and the temporal dimension is added on the basis of the DBSCAN algorithm. In the clustering using the ST_DBSCAN algorithm, the determination of the temporal dimension is added, and the problem of high density caused by the back and forth movement of trajectory may be effectively solved.

According to embodiments of the present disclosure, determining the target cluster from the at least one cluster according to the preset rule may include: determining a first related cluster from the at least one cluster, where the first related cluster includes at least a first target element and a second target element, and a distance difference obtained according to a displacement information in the first target element and a displacement information in the second target element is less than or equal to a second preset threshold; and determining the first related cluster as the target cluster.

According to embodiments of the present disclosure, a target vehicle is taken as an example of the target object. The second preset threshold may indicate a maximum distance that the target vehicle identified as in the stay state moves. That is, when the moving distance of the target vehicle is within a range limited by the second preset threshold, the state of the target vehicle may be determined as the stay state even if the target vehicle moves. For example, when the target vehicle moves back and forth multiple times in the same region, the position information of the target vehicle does not change significantly. In this case, combined with the temporal displacement information of the target vehicle, the state of the target vehicle moving back and forth may be easily determined as the stay state, so that the accuracy of the determined stay state of the vehicle may be improved.

According to embodiments of the present disclosure, determining the target cluster from the at least one cluster according to the preset rule may include determining the target cluster according to the distance difference. For example, each element in each cluster obtained by clustering may be analyzed, where the displacement information in each element may be analyzed. If the distance difference between two displacement information corresponding to two elements is less than the second preset threshold, and the two elements belong to the same cluster, then that cluster may be determined as the target cluster.

Through the above-mentioned embodiments of the present disclosure, a method of determining the target cluster is provided. On the one hand, a data basis is provided for the determination of the target stay point; on the other hand, by determining the target cluster combined with the temporal displacement data, the stay state of the target object may be determined more accurately and comprehensively.

According to embodiments of the present disclosure, determining the target cluster from the at least one cluster according to the preset rule may include: determining at least one second related cluster from the at least one cluster, where the second related cluster includes at least a third target element and a fourth target element, and a distance difference obtained according to a displacement information in the third target element and a displacement information in the fourth target element is less than or equal to a third preset threshold; determining a target second related cluster from the at least one second related cluster, where the target second related cluster includes at least a fifth target element and a sixth target element, and a time interval (or time difference) obtained according to a timestamp information in the fifth target element and a timestamp information in the sixth target element is greater than or equal to a fourth preset threshold; and determining the target second related cluster as the target cluster.

According to embodiments of the present disclosure, a target vehicle is taken as an example of the target object. The third preset threshold may be equal to or different from the second preset threshold, and may indicate the same meaning and feature as the second preset threshold. The fourth preset threshold may indicate a maximum duration that the target vehicle identified as in the stay state is allowed to stay. That is, when the duration of stay of the target vehicle is within a range limited by the fourth preset threshold, even if the target vehicle stays for a time period, the state of the target vehicle within that time period may not be determined as the stay state. In this way, a false determination for a reasonable stay of the target vehicle may be avoided. For example, when the target vehicle stays in a region close to the merchant for a short time period, it is possible that a passenger needs to get off temporarily, or the target vehicle may only stop temporarily. In this case, it may not be determined that the stay of the target vehicle has a possibility of inducing consumption. In this embodiment, by setting the fourth preset threshold, a type of cluster containing a reasonable stay state may be excluded, and the obtained target cluster has more practical significance.

According to embodiments of the present disclosure, determining the target cluster from the at least one second related cluster according to the preset rule may include determining the target cluster according to a combination of a distance difference and a time interval. For example, it may be specified that the duration of stay is more than 10 minutes, and a head to tail distance of the trajectory sequence of the stay does not exceed 1 km, and the like. Based on this, each element in each cluster obtained by clustering may be analyzed, where a displacement information and a timestamp information in each element may be analyzed. If a distance difference between two displacement information corresponding to two elements is less than the third preset threshold, such as 1 km, while the time interval between two timestamp information corresponding to the two elements is greater than or equal to the fourth preset threshold, such as 10 minutes, and the two elements belong to the same cluster, then that cluster may be determined as the target cluster.

Through the above-mentioned embodiments of the present disclosure, another method of determining the target cluster is provided. On the one hand, a data basis is provided for the determination of the target stay point; on the other hand, by determining the target cluster combined with the temporal displacement data, the stay state of the target object may be determined more accurately and comprehensively.

According to embodiments of the present disclosure, the above method of determining the state of the target object may further include: transmitting an early warning information when it is detected that the stay state of the target object is the abnormal stay state based on the method of determining the state of the target object.

According to embodiments of the present disclosure, a target vehicle is taken as an example of the target object. The transmission of the early warning information may include at least one selected from: a transmission of an early warning information such as "staying for a long time", "recommending to leave as soon as possible", etc. to the target vehicle, a transmission of an early warning information such as "the vehicle with license plate number XXX has stayed for a long time in XXX" to a management platform in a popular region, or the like, so that the target vehicle may leave according to the early warning information, or a manager in the popular region may manage the vehicle with a possibility of inducing consumption according to the early warning information.

Through the above-mentioned embodiments of the present disclosure, by transmitting the early warning information when it is determined that the target object is in the abnormal stay state, the abnormal stay of the target object in some regions may be alleviated, which may facilitate the management of popular regions.

Figure 3:
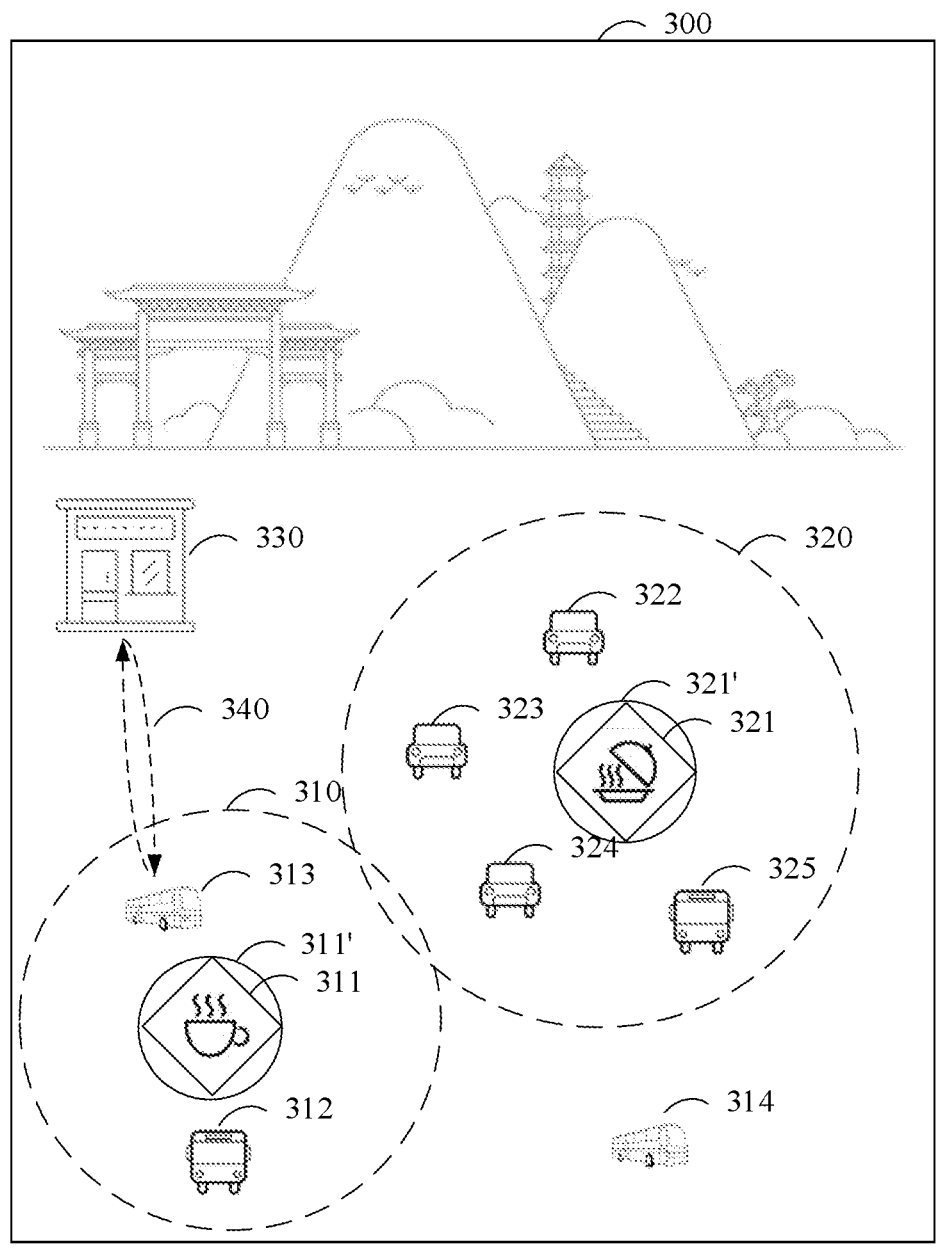
FIG. 3 schematically shows an overall flowchart of a method of determining a vehicle state according to an embodiment of the present disclosure.

FIG. 3 schematically shows a schematic diagram of determining a state of a vehicle according to an embodiment of the present disclosure.

As shown in FIG. 3, a popular region includes a target region 300. The target region 300 includes a target sub-region 311' determined according to a merchant 311, a target sub-region 321' determined according to a merchant 321, and a management office 330. Respective first preset positions of the merchants 311 and 321 are determined according to positions of the merchants 311 and 321. For example, distances between all points in a region 310 and the first preset position determined according to the merchant 311 are less than the first preset threshold. Based on this, it may be directly determined that a medium bus 312 and a bus 313 staying in the region 310 are in the abnormal stay state, or whether the medium bus 312 and the bus 313 are in the abnormal stay state may be determined combined with a determination of whether the duration that the medium bus 312 and the bus 313 stay in the region 310 exceeds the fourth preset threshold. Similarly, for example, distances between all points in a region 320 and the first preset position determined according to the merchant 321 are less than the first preset threshold. Private cars 322, 323 and 324 may be vehicles without the problem of inducing consumption. Then, it may be directly determined that a medium bus 325 staying in the region 320 is in the abnormal stay state, or whether the medium bus 325 is in the abnormal stay state may be determined combined with a determination of whether the duration that the medium bus 325 stays in the region 320 exceeds the fourth preset threshold. A bus 314 is not located in the region where the abnormal stay state may exist, and it may be determined that the bus 314 is not in the abnormal stay state, no matter how long it stays at a position shown in FIG. 3.

According to embodiments of the present disclosure, on the basis of the determination that the bus 313 is in the abnormal stay state, an early warning information may be transmitted to the management office, and/or an information of "please leave as soon as possible" may be transmitted by the management office to the bus 313 through a communication link 340.

It should be noted that all vehicles in the target region 300 may generate displacement information, and the temporal trajectory sequence of each vehicle in the target region 300 may be determined according to the displacement information, so that the target stay point of the target vehicle may be further determined by the combination of the ST_DBSCAN and the preset rule. In this embodiment, the target vehicle may include medium buses and buses.

Through the above-mentioned embodiments of the present disclosure, an ST_DBSCAN clustering-based method of determining an abnormal stay point of a vehicle is provided. Different from a rule matching method using video data, the method of the present disclosure may avoid problems of high cost of video data, relying on a license plate recognition ability, and a poor robustness. Different from the existing DBSCAN clustering algorithm, the temporal dimension is added in the method of the present disclosure, and the accuracy of the recalled stay point may be improved.

Figure 4:
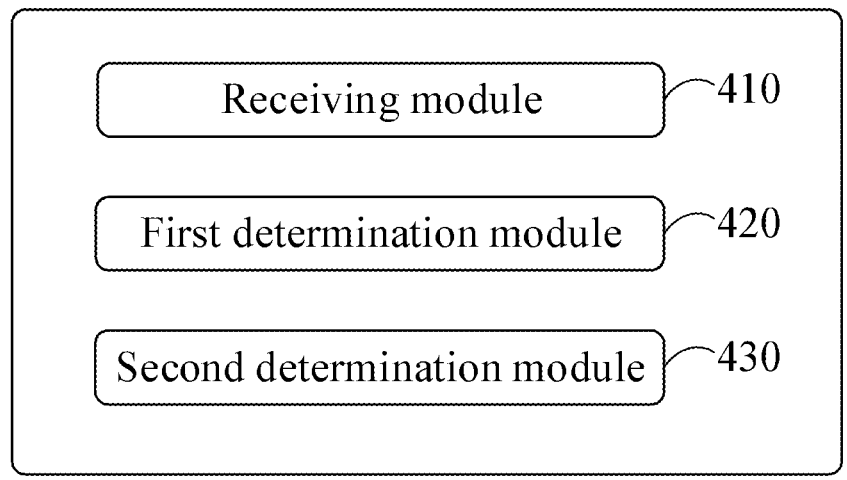
FIG. 4 schematically shows a block diagram of an apparatus of determining a state of a target object according to an embodiment of the present disclosure.

FIG. 4 schematically shows a block diagram of an apparatus of determining a state of a target object according to embodiments of the present disclosure.

As shown in FIG. 4, an apparatus 400 of determining a state of a vehicle includes a receiving module 410, a first determination module 420, and a second determination module 430.

The receiving module 410 is used to receive a transmitted first moving point sequence for a target object. The first moving point sequence includes a plurality of target moving point elements, and each target moving point element contains a timestamp information and a displacement information that are used to indicate a stay state of the target object.

The first determination module 420 is used to determine, from the first moving point sequence, a target stay point of the target object according to the timestamp information and the displacement information.

The second determination module 430 is used to determine that a state of the target object at the target stay point is an abnormal stay state, when a distance between the target stay point and a first preset position is less than a first preset threshold.

According to embodiments of the present disclosure, the first determination module includes a clustering unit, a first determination unit, and a second determination unit.

The clustering unit is used to perform clustering on the first moving point sequence according to the timestamp information and the displacement information, so as to obtain at least one cluster.

The first determination unit is used to determine a target cluster from the at least one cluster according to a preset rule.

The second determination unit is used to determine a target stay point according to an element value corresponding to a cluster center of the target cluster.

According to embodiments of the present disclosure, the first determination unit includes a first determination sub-unit and a first definition sub-unit.

The first determination sub-unit is used to determine a first related cluster from the at least one cluster. The first related cluster includes at least a first target element and a second target element, and a distance difference obtained according to the displacement information in the first target element and the displacement information in the second target element is less than or equal to a second preset threshold.

The first definition sub-unit is used to determine the first related cluster as the target cluster.

According to embodiments of the present disclosure, the first determination unit may include a second determination sub-unit, a third determination sub-unit, and a second definition sub-unit.

The second determination sub-unit is used to determine at least one second related cluster from the at least one cluster. The second related cluster includes at least a third target element and a fourth target element, and a distance difference obtained according to the displacement information in the third target element and the displacement information in the fourth target element is less than or equal to a third preset threshold.

The third determination sub-unit is used to determine a target second related cluster from the at least one second related cluster. The target second related cluster includes at least a fifth target element and a sixth target element, and a time interval obtained according to the timestamp information in the fifth target element and the timestamp information in the sixth target element is greater than or equal to a fourth preset threshold.

The second definition sub-unit is used to determine the target second related cluster as the target cluster.

According to embodiments of the present disclosure, the clustering unit may include a clustering sub-unit.

The clustering sub-unit is used to perform clustering on the first moving point sequence by using a spatio-temporal constraint-based clustering algorithm.

According to embodiments of the present disclosure, the apparatus of determining the state of the vehicle may further include a first acquisition module, a third determination module, and a fourth determination module.

The first acquisition module is used to acquire a second moving point sequence for a plurality of objects in a target region. The second moving point sequence includes identification information of the objects corresponding to the second moving point sequence.

The third determination module is used to determine a target identification information of the target object.

The fourth determination module is used to determine the first moving point sequence from the second moving point sequence according to the target identification information.

According to embodiments of the present disclosure, the apparatus of determining the state of the vehicle may further include a second acquisition module, a fifth determination module, and a sixth determination module.

The second acquisition module is used to acquire the identification information of the plurality of objects in the target region.

The fifth determination module is used to determine the target identification information of the target object.

The sixth determination module is used to determine the target object from the plurality of objects according to the target identification information.

According to embodiments of the present disclosure, the apparatus of determining the state of the vehicle may further include a transmission module.

The transmission module is used to transmit an early warning information when the state of the target object is detected as an abnormal stay state.

According to embodiments of the present disclosure, the present disclosure further provides an electronic device, a readable storage medium, and a computer program product.

According to embodiments of the present disclosure, an electronic device is provided, including: at least one processor; and a memory communicatively connected to the at least one processor, wherein the memory stores instructions executable by the at least one processor, and the instructions, when executed by the at least one processor, cause the at least one processor to implement the method of determining the state of the target object as described above.

According to embodiments of the present disclosure, a non-transitory computer-readable storage medium having computer instructions therein is provided, and the computer instructions are used to cause a computer to implement the method of determining the state of the target object as described above.

According to embodiments of the present disclosure, a computer program product containing a computer program is provided, and the computer program, when executed by a processor, causes the processor to implement the method of determining the state of the target object as described above.

Figure 5:
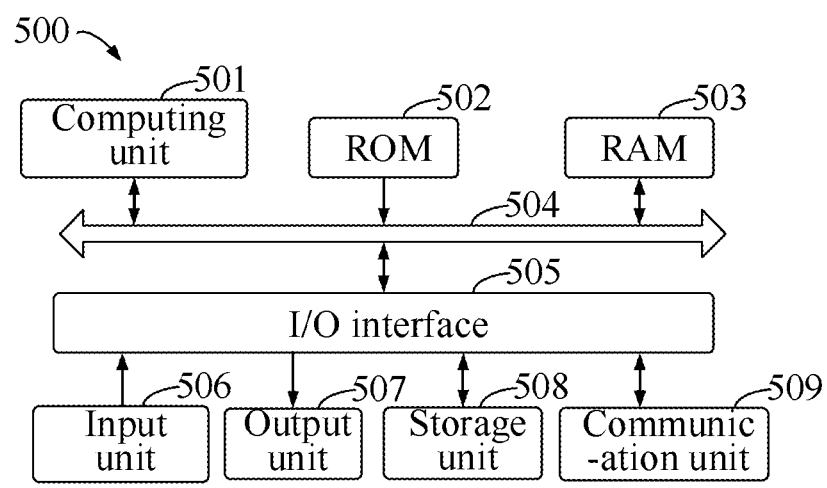
FIG. 5 shows a schematic block diagram of an exemplary electronic device for implementing embodiments of the present disclosure.

FIG. 5 shows a schematic block diagram of an exemplary electronic device 500 for implementing embodiments of the present disclosure. The electronic device is intended to represent various forms of digital computers, such as a laptop computer, a desktop computer, a workstation, a personal digital assistant, a server, a blade server, a mainframe computer, and other suitable computers. The electronic device may further represent various forms of mobile devices, such as a personal digital assistant, a cellular phone, a smart phone, a wearable device, and other similar computing devices. The components as illustrated herein, and connections, relationships, and functions thereof are merely examples, and are not intended to limit the implementation of the present disclosure described and/or required herein.

As shown in FIG. 5, the electronic device 500 includes a computing unit 501 which may perform various appropriate actions and processes according to a computer program stored in a read only memory (ROM) 502 or a computer program loaded from a storage unit 508 into a random access memory (RAM) 503. In the RAM 503, various programs and data necessary for an operation of the electronic device 500 may also be stored. The computing unit 501, the ROM 502 and the RAM 503 are connected to each other through a bus 504. An input/output (I/O) interface 505 is also connected to the bus 504.

A plurality of components in the electronic device 500 are connected to the I/O interface 505, including: an input unit 506, such as a keyboard, or a mouse; an output unit 507, such as displays or speakers of various types; a storage unit 508, such as a disk, or an optical disc; and a communication unit 509, such as a network card, a modem, or a wireless communication transceiver. The communication unit 509 allows the electronic device 500 to exchange information/data with other devices through a computer network such as Internet and/or various telecommunication networks.

The computing unit 501 may be various general-purpose and/or dedicated processing assemblies having processing and computing capabilities. Some examples of the computing units 501 include, but are not limited to, a central processing unit (CPU), a graphics processing unit (GPU), various dedicated artificial intelligence (AI) computing chips, various computing units that run machine learning model algorithms, a digital signal processing processor (DSP), and any suitable processor, controller, microcontroller, etc. The computing unit 501 executes various methods and processes described above, such as the method of determining the state of the target object. For example, in some embodiments, the method of determining the state of the target object may be implemented as a computer software program which is tangibly embodied in a machine-readable medium, such as the storage unit 508. In some embodiments, the computer program may be partially or entirely loaded and/or installed in the electronic device 500 via the ROM 502 and/or the communication unit 509. The computer program, when loaded in the RAM 503 and executed by the computing unit 501, may execute one or more steps in the method of determining the state of the target object. Alternatively, in other embodiments, the computing unit 501 may be configured to perform the method of determining the state of the target object by any other suitable means (e.g., by means of firmware).

Various embodiments of the systems and technologies described herein may be implemented in a digital electronic circuit system, an integrated circuit system, a field programmable gate array (FPGA), an application specific integrated circuit (ASIC), an application specific standard product (ASSP), a system on chip (SOC), a complex programmable logic device (CPLD), a computer hardware, firmware, software, and/or combinations thereof. These various embodiments may be implemented by one or more computer programs executable and/or interpretable on a programmable system including at least one programmable processor. The programmable processor may be a dedicated or general-purpose programmable processor, which may receive data and instructions from a storage system, at least one input device and at least one output device, and may transmit the data and instructions to the storage system, the at least one input device, and the at least one output device.

Program codes for implementing the methods of the present disclosure may be written in one programming language or any combination of more programming languages. These program codes may be provided to a processor or controller of a general-purpose computer, a dedicated computer or other programmable data processing apparatus, such that the program codes, when executed by the processor or controller, cause the functions/operations specified in the flowcharts and/or block diagrams to be implemented. The program codes may be executed entirely on a machine, partially on a machine, partially on a machine and partially on a remote machine as a stand-alone software package or entirely on a remote machine or server.

In the context of the present disclosure, a machine-readable medium may be a tangible medium that may contain or store a program for use by or in connection with an instruction execution system, an apparatus or a device. The machine-readable medium may be a machine-readable signal medium or a machine-readable storage medium. The machine-readable medium may include, but is not limited to, an electronic, magnetic, optical, electromagnetic, infrared, or semiconductor system, apparatus or device, or any suitable combination of the above. More specific examples of the machine-readable storage medium may include an electrical connection based on one or more wires, a portable computer disk, a hard disk, a random access memory (RAM), a read only memory (ROM), an erasable programmable read only memory (EPROM or a flash memory), an optical fiber, a compact disk read only memory (CD-ROM), an optical storage device, a magnetic storage device, or any suitable combination of the above.

In order to provide interaction with the user, the systems and technologies described here may be implemented on a computer including a display device (for example, a CRT (cathode ray tube) or LCD (liquid crystal display) monitor) for displaying information to the user, and a keyboard and a pointing device (for example, a mouse or a trackball) through which the user may provide the input to the computer. Other types of devices may also be used to provide interaction with the user. For example, a feedback provided to the user may be any form of sensory feedback (for example, visual feedback, auditory feedback, or tactile feedback), and the input from the user may be received in any form (including acoustic input, voice input or tactile input).

The systems and technologies described herein may be implemented in a computing system including back-end components (for example, a data server), or a computing system including middleware components (for example, an application server), or a computing system including front-end components (for example, a user computer having a graphical user interface or web browser through which the user may interact with the implementation of the system and technology described herein), or a computing system including any combination of such back-end components, middleware components or front-end components. The components of the system may be connected to each other by digital data communication (for example, a communication network) in any form or through any medium. Examples of the communication network include a local area network (LAN), a wide area network (WAN), and the Internet.

The computer system may include a client and a server. The client and the server are generally far away from each other and usually interact through a communication network. The relationship between the client and the server is generated through computer programs running on the corresponding computers and having a client-server relationship with each other. The server may be a cloud server, or a server of a distributed system, or a server combined with a block-chain.

It should be understood that steps of the processes illustrated above may be reordered, added or deleted in various manners. For example, the steps described in the present disclosure may be performed in parallel, sequentially, or in a different order, as long as a desired result of the technical solution of the present disclosure may be achieved. This is not limited in the present disclosure.

The above-mentioned specific embodiments do not constitute a limitation on the scope of protection of the present disclosure. Those skilled in the art should understand that various modifications, combinations, sub-combinations and substitutions may be made according to design requirements and other factors. Any modifications, equivalent replacements and improvements made within the spirit and principles of the present disclosure shall be contained in the scope of protection of the present disclosure.

What is claimed is:

1. A method of determining a state of a target object using an electronic device, comprising:
receiving a transmitted first moving point sequence for the target object, wherein the first moving point sequence comprises a plurality of target moving point elements, and each of the plurality of target moving point elements contains a timestamp information and a displacement information that indicate a stay state of the target object;
determining, from the first moving point sequence, a target stay point of the target object, according to the timestamp information and the displacement information; and
determining that the state of the target object at the target stay point is an abnormal stay state, in response to a distance between the target stay point and a first preset position being less than a first preset threshold.

2. The method according to claim 1, wherein the determining, from the first moving point sequence, a target stay point of the target object, according to the timestamp information and the displacement information comprises:
performing clustering on the first moving point sequence according to the timestamp information and the displacement information, so as to obtain at least one cluster;
determining a target cluster from the at least one cluster according to a preset rule; and determining the target stay point according to an element value corresponding to a cluster center of the target cluster.

3. The method according to claim 2, wherein the determining a target cluster from the at least one cluster according to a preset rule comprises:
   determining a first related cluster from the at least one cluster, wherein the first related cluster comprises at least a first target element and a second target element, and a distance difference obtained according to a displacement information in the first target element and a displacement information in the second target element is less than or equal to a second preset threshold; and
   determining the first related cluster as the target cluster.

4. The method according to claim 3, wherein the performing clustering on the first moving point sequence comprises:
   performing clustering on the first moving point sequence by using a spatio-temporal constraint-based clustering algorithm.

5. The method according to claim 3, further comprising:
   acquiring a second moving point sequence for a plurality of objects in a target region, wherein the second moving point sequence contains identification information of the plurality of objects corresponding to the second moving point sequence;
   determining a target identification information of the target object; and
   determining the first moving point sequence from the second moving point sequence according to the target identification information.

6. The method according to claim 3, further comprising:
   acquiring identification information of a plurality of objects in a target region;
   determining a target identification information of the target object; and
   determining the target object from the plurality of objects according to the target identification information.

7. The method according to claim 2, wherein the determining a target cluster from the at least one cluster according to a preset rule comprises:
   determining at least one second related cluster from the at least one cluster, wherein the second related cluster comprises at least a third target element and a fourth target element, and a distance difference obtained according to a displacement information in the third target element and a displacement information in the fourth target element is less than or equal to a third preset threshold;
   determining a target second related cluster from the at least one second related cluster, wherein the target second related cluster comprises at least a fifth target element and a sixth target element, and a time interval obtained according to a timestamp information in the fifth target element and a timestamp information in the sixth target element is greater than or equal to a fourth preset threshold; and
   determining the target second related cluster as the target cluster.

8. The method according to claim 7, wherein the performing clustering on the first moving point sequence comprises:
   performing clustering on the first moving point sequence by using a spatio-temporal constraint-based clustering algorithm.

9. The method according to claim 7, further comprising:
   acquiring a second moving point sequence for a plurality of objects in a target region, wherein the second moving point sequence contains identification information of the plurality of objects corresponding to the second moving point sequence;
   determining a target identification information of the target object; and
   determining the first moving point sequence from the second moving point sequence according to the target identification information.

10. The method according to claim 2, wherein the performing clustering on the first moving point sequence comprises:
    performing clustering on the first moving point sequence by using a spatio-temporal constraint-based clustering algorithm.

11. The method according to claim 10, further comprising:
    acquiring a second moving point sequence for a plurality of objects in a target region, wherein the second moving point sequence contains identification information of the plurality of objects corresponding to the second moving point sequence;
    determining a target identification information of the target object; and
    determining the first moving point sequence from the second moving point sequence according to the target identification information.

12. The method according to claim 2, further comprising:
    acquiring a second moving point sequence for a plurality of objects in a target region, wherein the second moving point sequence contains identification information of the plurality of objects corresponding to the second moving point sequence;
    determining a target identification information of the target object; and
    determining the first moving point sequence from the second moving point sequence according to the target identification information.

13. The method according to claim 2, further comprising:
    acquiring identification information of a plurality of objects in a target region;
    determining a target identification information of the target object; and
    determining the target object from the plurality of objects according to the target identification information.

14. The method according to claim 2, further comprising:
    transmitting an early warning information, in response to the state of the target object being detected as the abnormal stay state.

15. The method according to claim 1, further comprising:
    acquiring a second moving point sequence for a plurality of objects in a target region, wherein the second moving point sequence contains identification information of the plurality of objects corresponding to the second moving point sequence;
    determining a target identification information of the target object; and
    determining the first moving point sequence from the second moving point sequence according to the target identification information.

16. The method according to claim 1, further comprising:
    acquiring identification information of a plurality of objects in a target region;
    determining a target identification information of the target object; and
    determining the target object from the plurality of objects according to the target identification information.

17. The method according to claim 1, further comprising:
transmitting an early warning information, in response to the state of the target object being detected as the abnormal stay state.

18. An electronic device, comprising:
at least one processor; and
a memory communicatively connected to the at least one processor, wherein the memory stores instructions executable by the at least one processor, and the instructions, when executed by the at least one processor, cause the at least one processor to at least:
receive a transmitted first moving point sequence for the target object, wherein the first moving point sequence comprises a plurality of target moving point elements, and each of the plurality of target moving point elements contains a timestamp information and a displacement information that indicate a stay state of the target object;
determine, from the first moving point sequence, a target stay point of the target object, according to the timestamp information and the displacement information; and
determine that the state of the target object at the target stay point is an abnormal stay state, in response to a distance between the target stay point and a first preset position being less than a first preset threshold.

19. The electronic device according to claim 18, wherein the instructions are further configured to cause the at least one processor to at least:
perform clustering on the first moving point sequence according to the timestamp information and the displacement information, so as to obtain at least one cluster;
determine a target cluster from the at least one cluster according to a preset rule; and
determine the target stay point according to an element value corresponding to a cluster center of the target cluster.

20. A non-transitory computer-readable storage medium having computer instructions therein, wherein the computer instructions are configured to cause a computer to at least:
receive a transmitted first moving point sequence for a target object using an electronic device, wherein the first moving point sequence comprises a plurality of target moving point elements, and each of the plurality of target moving point elements contains a timestamp information and a displacement information that indicate a stay state of the target object;
determine, from the first moving point sequence, a target stay point of the target object, according to the timestamp information and the displacement information; and
determine that the state of the target object at the target stay point is an abnormal stay state, in response to a distance between the target stay point and a first preset position being less than a first preset threshold.

* * * * *